(12) United States Patent
Schroeder

(10) Patent No.: US 7,719,996 B2
(45) Date of Patent: May 18, 2010

(54) ENCODING TIMESTAMPS

(75) Inventor: Michael Schroeder, Richardson, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 870 days.

(21) Appl. No.: 11/534,903

(22) Filed: Sep. 25, 2006

(65) Prior Publication Data

US 2008/0075018 A1     Mar. 27, 2008

(51) Int. Cl.
  *G01R 31/08*    (2006.01)
  *G06F 1/04*     (2006.01)
  *H04L 9/32*     (2006.01)
  *G06G 1/00*     (2006.01)

(52) U.S. Cl. .................. 370/252; 713/502; 713/178; 713/501

(58) Field of Classification Search ................. 370/252; 702/187, 177–178; 713/501, 502, 178
  See application file for complete search history.

(56) References Cited

U.S. PATENT DOCUMENTS

| | | | | |
|---|---|---|---|---|
| 3,906,346 A | * | 9/1975 | Hunter | .................. 377/20 |
| 4,764,863 A | * | 8/1988 | Silverthorn et al. | ........... 714/39 |
| 6,137,421 A | * | 10/2000 | Dykema | ................ 340/825.69 |
| 6,148,427 A | * | 11/2000 | Sherwood et al. | ........... 714/738 |
| 6,564,334 B1 | * | 5/2003 | Zattiero et al. | .............. 713/502 |
| 6,803,866 B2 | * | 10/2004 | Brown et al. | .................. 341/90 |
| 6,992,792 B2 | * | 1/2006 | Blumer | ........................ 358/1.2 |
| 7,020,808 B2 | * | 3/2006 | Sato et al. | ...................... 714/47 |
| 7,113,886 B2 | * | 9/2006 | West | .......................... 702/178 |
| 7,325,153 B2 | * | 1/2008 | Terry | .......................... 713/501 |
| 7,434,248 B2 | * | 10/2008 | Tanaka et al. | ................. 725/80 |
| 2003/0028778 A1 | * | 2/2003 | Couillard | .................... 713/178 |
| 2003/0126490 A1 | * | 7/2003 | Litt et al. | .................... 713/502 |
| 2006/0129350 A1 | * | 6/2006 | West | .......................... 702/176 |
| 2007/0047458 A1 | * | 3/2007 | Adkisson | .................... 370/252 |

* cited by examiner

*Primary Examiner*—Steven H Nguyen
*Assistant Examiner*—Candal Elpenord

(57) ABSTRACT

A logging system comprising counting logic adapted to generate a raw timestamp. The system further comprises encoding logic coupled to the counting logic and adapted to insert a group of bits of the raw timestamp into a predetermined timestamp template to produce an encoded timestamp. The template is selected based on a position of a most significant bit of the raw timestamp.

21 Claims, 4 Drawing Sheets

FIG. 3

| ROW | DECIMAL VALUE RANGE | 32-BIT BINARY VALUE RANGE | BITS EXTRACTED FROM BINARY VALUE FOR TIMESTAMP | TIMESTAMP TEMPLATE | ACTUAL 10-BIT TIMESTAMP RANGE |
|---|---|---|---|---|---|
| 1 | 0– 511 | 0000 0000 0000 0000 0000 0000 0000 0000<br>31:9   8:0<br>31:9<br>0000 0000 0000 0000 0000 0000 1111 1111<br>31:9   8:0<br>31:9 | 8:0 | 0XXXXXXXX   8:0<br>9 | 0000000000  8:0<br>9<br>0111111111  8:0<br>9 |
| 2 | 512– 1K-1 | 0000 0000 0000 0000 0000 0000 0010 0000X  0<br>31:10  9  8:1<br>31:10<br>0000 0000 0000 0000 0000 0001 1111 111X, 0<br>31:10  9  8:1<br>31:10 | 8:1 | 10XXXXXXX  7:0<br>9:8 | 1000000000  7:0<br>9:8<br>1011111111  7:0<br>9:8 |
| 3 | 1K– 8K-1 | 0000 0000 0000 0000 0000 0100 00XX XXXX<br>31:13  12:6  5:0<br>31:13<br>0000 0000 0000 0000 0001 1111 11XX XXXX<br>31:13  12:6  5:0<br>31:13 | 12:6 | 110XXXXXX  6:0<br>9:7 | 1100010000  6:0<br>9:7<br>1101111111  6:0<br>9:7 |
| 4 | 8K– 512K-1 | 0000 0000 0000 0000 0010 0001 XXXX XXXX<br>31:19  18:13  12:0<br>31:19<br>0000 0000 0000 0000 0111 111X XXXX XXXX<br>31:19  18:13  12:0<br>31:19 | 18:13 | 1110XXXXX  5:0<br>9:6 | 1110000001  5:0<br>9:6<br>1110111111  5:0<br>9:6 |
| 5 | 512K– 16M-1 | 0000 0000 0000 1XXX XXXX XXXX XXXX XXXX<br>31:24  23:19  18:0<br>31:24<br>0000 0000 1111 1XXX XXXX XXXX XXXX XXXX<br>31:24  23:19  18:0<br>31:24 | 23:19 | 11110XXXX  4:0<br>9:5 | 1111000001  4:0<br>9:5<br>1111011111  4:0<br>9:5 |
| 6 | 16M– 256M-1 | 0000 0001, XXXX XXXX XXXX XXXX XXXX XXXX<br>31:28 27:24  23:0<br>0000 1111, XXXX XXXX XXXX XXXX XXXX XXXX<br>31:28 27:24  23:0 | 27:24 | 111110XXXX  3:0<br>9:4 | 1111100001  3:0<br>9:4<br>1111101111  3:0<br>9:4 |
| 7 | 256M– 4G-1 | 0001, XXXX XXXX XXXX XXXX XXXX XXXX XXXX<br>31:28  27:0<br>31:28<br>1111, XXXX XXXX XXXX XXXX XXXX XXXX XXXX<br>31:28  27:0<br>31:28 | 31:28 | 111111XXXX  3:0<br>9:4 | 1111110001  3:0<br>9:4<br>1111111111  3:0<br>9:4 |

302 304 306 308 310 312

300

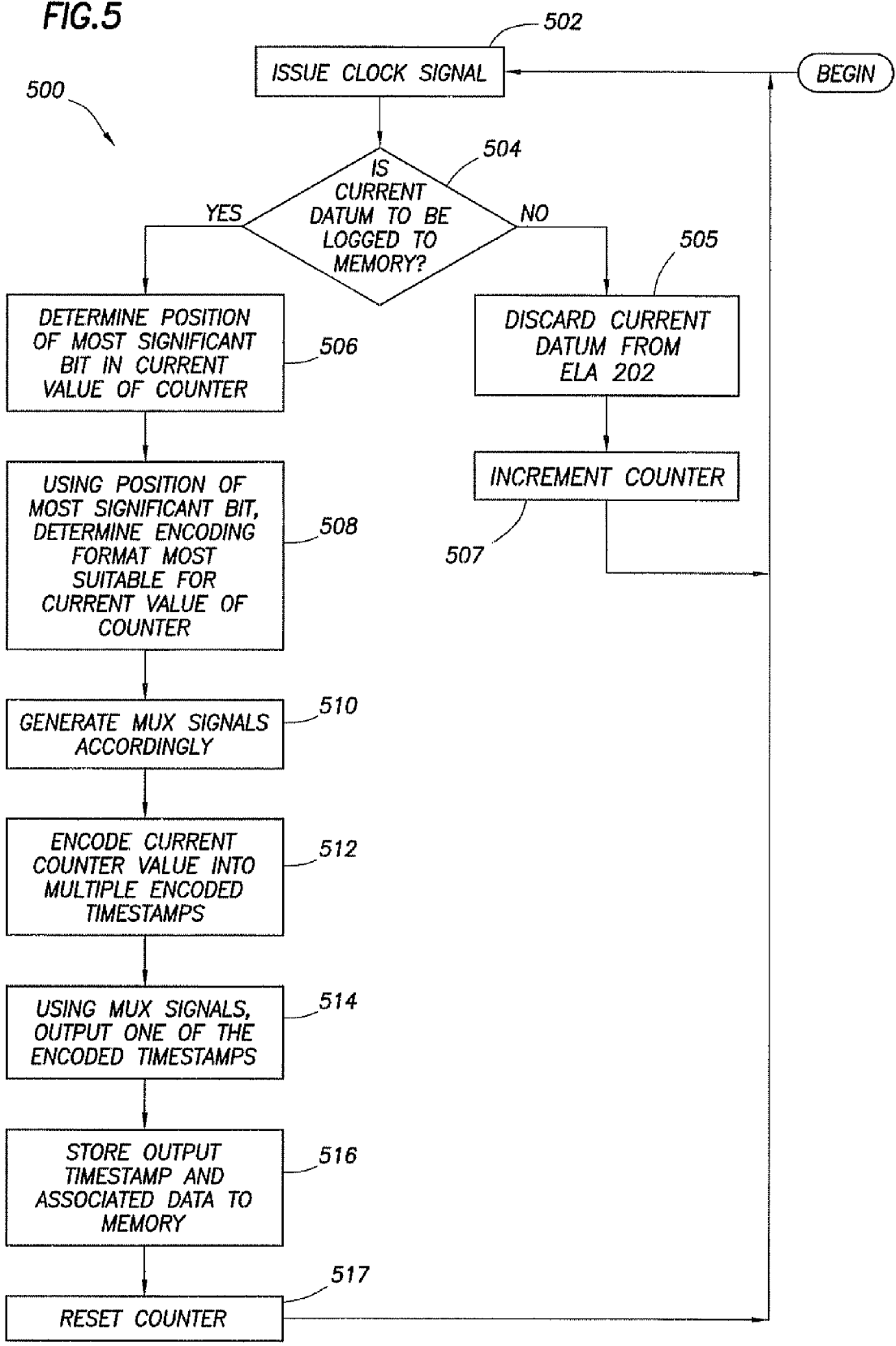

ENCODING TIMESTAMPS

BACKGROUND

When testing computer hardware or software, developers will often embed testing logic onto an integrated circuit (IC). The testing logic logs data (e.g., generated by the IC or logic external to the IC) and timestamps associated with the data to a memory in the testing logic. The developers analyze the timestamps and associated data to evaluate hardware and software performance. Testing logic contains a finite amount of memory and, at times, unfortunately not enough memory to meet the needs of a developer.

BRIEF DESCRIPTION OF THE DRAWINGS

For a detailed description of exemplary embodiments of the invention, reference will now be made to the accompanying drawings in which:

FIG. 3 shows a table describing timestamp encoding techniques that are in accordance with embodiments of the invention;

FIG. 5 shows a flow diagram in accordance with embodiments of the invention.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. Further, the term "or" is intended to be used in an inclusive sense rather than in an exclusive sense.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Embodiments of the invention are directed to techniques for encoding timestamps which are stored in the memory of an IC's testing logic. Such techniques effectively reduce the size of the timestamps, thereby enabling more test-related information to be stored in less memory.

Figure 1:
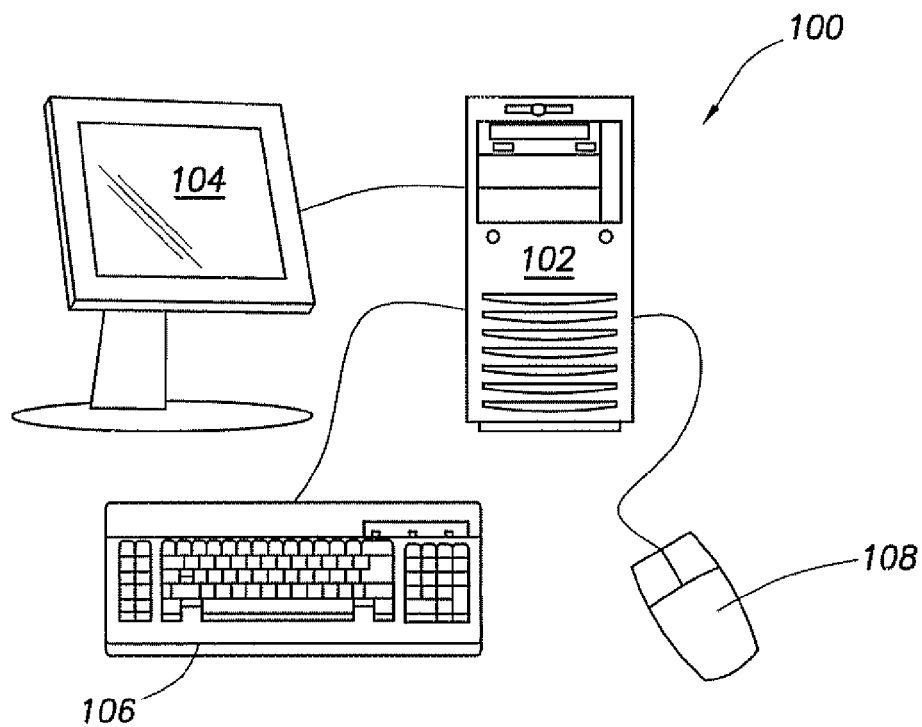
FIG. 1 shows a computer system in accordance with embodiments of the invention.

FIG. 1 shows a computer system 100 implementing the timestamp encoding techniques described herein. The computer system 100 comprises a processing unit 102 and a display 104. The computer system 100 may comprise additional output devices, including printers, network connections, disk drives, etc. The computer system 100 comprises input devices including a keyboard 106 and a mouse 108, although the scope of disclosure is not limited to the use of any particular type of input device.

Figure 2:
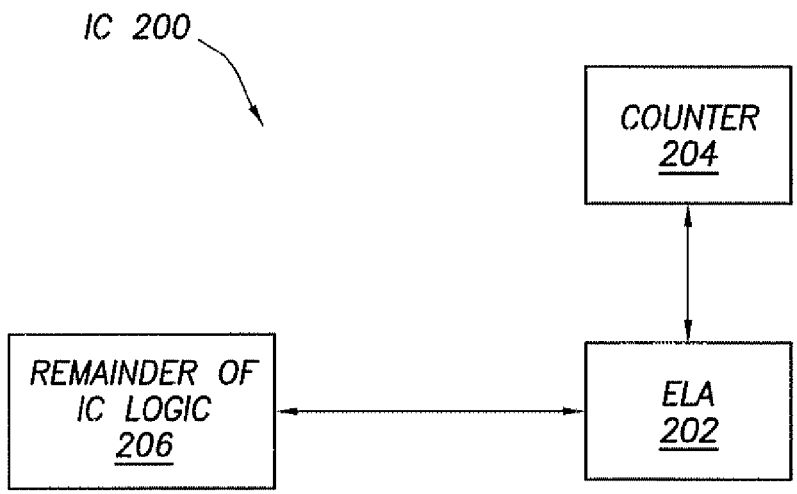
FIG. 2 shows an integrated circuit (IC) located inside the computer system of FIG. 1, in accordance with embodiments of the invention.

FIG. 2 shows an integrated circuit (IC) 200 located inside, for example, the processing unit 102. The IC 200 may, for instance, be mounted on a motherboard or other hardware inside the processing unit 102. The IC 200 also may be used in any suitable equipment and is not restricted to use solely in computers. The IC 200 comprises an embedded logic analyzer (ELA) 202 and a counter 204. As the remainder of this disclosure describes the function of the ELA 202 and the counter 204, the remainder of the logic associated with the IC 200 is hereinafter collectively referred to using numeral 206. In accordance with embodiments of the invention, the ELA 202 logs data generated by IC logic 206. Because the IC logic 206 may perform any of a variety of functions, the data generated by IC logic 206 may be of various types, e.g., processor tracing data.

As previously mentioned, each datum logged by the ELA 202 is associated with a timestamp. The timestamp is generated by the counter 204. In some embodiments, the timestamp indicates the number of clock cycles that have elapsed since the most recent datum was logged to the ELA 202. Thus, for instance, if a datum is logged every clock cycle, each datum may be associated with a timestamp of "0." If a second datum is logged five clock cycles after a first datum is logged, the second datum may be associated with a timestamp of "5." For each datum logged to the ELA 202, the ELA 202 receives from the counter 204 a raw timestamp value and encodes the raw timestamp value to produce an encoded timestamp value that has a smaller size than the raw timestamp value. The ELA 202 then stores the encoded timestamp value along with associated data for future analysis. The encoded timestamp is a compressed version of the raw timestamp and, as such, occupies less memory space in the ELA 202. An illustrative timestamp encoding technique is now described in detail.

FIG. 3 shows a table 300 describing the timestamp encoding technique performed by the ELA 202. Although the timestamp encoding technique shown in table 300 is representative of some embodiments, the scope of disclosure is not limited to these specific embodiments. Other embodiments may use similar encoding techniques or variations of the encoding technique described in table 300. Further, the various encoding techniques encompassed by the scope of disclosure may be applied to timestamps as well as other data suitable for encoding.

The encoding technique described herein is used to encode different numerical values (e.g., timestamps) in different ways (or "formats"), depending on the size of the value being encoded. For example, the ELA 202 may use one format of the encoding technique to encode a relatively small number, such as "1," and may use a different format of the same encoding technique to encode a relatively large number, such as "1024." Accordingly, table 300 of FIG. 3 comprises a plurality of rows 1-7. Each of the rows corresponds to a different format of the encoding technique and, as such, each row's format is used to encode a different size numerical value. For instance, as described in detail below, the format of row 1 is used to encode smaller values (e.g., numerical values between "0" and "511") and the format of row 7 is used to encode larger values (ergo, numerical values between "256M" and "4G-1").

Each row 1-7 corresponds to six columns 302, 304, 306, 308, 310 and 312. Column 302 indicates a number 1-7 associated with each row. For each row, column 304 describes the range, in decimal format, of the numerical values which can be encoded by the encoding format of that particular row. For each row, column 306 describes the 32-bit binary equivalent of the range indicated in column 304. This 32-bit binary value is the raw timestamp value transferred from the counter 204 to the ELA 202 (as shown in FIG. 2) for encoding. For each row, column 308 identifies the bits that the ELA 202 extracts from the 32-bit raw timestamp value of column 306 to encode the raw timestamp value. For each row, column 310 shows a timestamp template that the ELA 202 uses to encode a raw timestamp value. For each row, column 312 shows the range of encoded timestamp values that may be generated using the format of that row. As described above, the encoded timestamps shown in column 312 are smaller in size than the raw timestamps shown in column 306. Accordingly, the encoded timestamps occupy less memory space than do the raw timestamps. Each of the rows is now described in detail.

As indicated by column 304, the encoding technique format associated with row 1 is able to encode raw timestamp values that range from "0" to "511" (decimal format). Column 306 shows the 32-bit binary equivalent of the range "0-511." Column 308 indicates that the ELA 202 extracts bits 8:0 from the 32-bit raw timestamp value received from the counter 204 in order to encode the raw timestamp value. Column 310 indicates a timestamp template having 10 bits. As described below, the ELA 202 inserts bits 8:0 extracted from the raw timestamp value into the bits marked as "X" in the timestamp template. Bits in the timestamp template not marked as "X" (i.e., marked as a "0" or a "1" bit) are specifically assigned to facilitate the later decoding of the encoded timestamp. Replacing the "X" bits in the template of row 1, column 310 with bits 8:0 of the minimum and maximum 32-bit raw timestamp values shown in column 306 produces the range of encoded timestamp values shown in row 1, column 312. Specifically, the minimum 32-bit value in the range of column 306 has bits 8:0 as "0 0000 0000." These bits are inserted into the "X" bits of the timestamp template, thus producing the encoded timestamp "0000000000" shown in column 312. Likewise, the maximum 32-bit value in the range of column 306 has bits 8:0 as "1 1111 1111." These bits are inserted into the "X" bits of the timestamp template, thus producing the encoded timestamp "0111111111." After encoding a 32-bit raw timestamp in this manner, the ELA 202 stores the timestamp, along with any associated data, to a suitable storage device (e.g., memory). The 10-bit encoded timestamp may later be decoded to its original 32-bit form by reversing the encoding process of row 1, as described further below. In this way, raw timestamps in the 0-511 range are represented by encoded timestamps in the 0000000000-0111111111 range.

As shown in column 304, the encoding format associated with row 2 is used to encode timestamp values ranging from "512" to "1k-1" (i.e., where k=1024). Column 306 shows the 32-bit equivalents of the minimum and maximum timestamp values that are encoded using the encoding format of row 2. Column 308 indicates that the ELA 202 extracts bits 8:1 of the 32-bit raw timestamp received from the counter 204 and inserts these bits into the bit places marked "X" in the timestamp template of column 310 (i.e., into bits 7:0) to produce the encoded timestamp. As shown in column 310, bits 9:8 are specifically assigned values of "1 0" to facilitate later decoding of the encoded timestamp. Replacing the bits marked "X" in the timestamp template with bits 8:1 of the minimum 32-bit raw timestamp value shown in column 306 produces the encoded timestamp value "1000000000" shown in column 312. Similarly, replacing the bits marked "X" in the timestamp template with bits 8:1 of the maximum 32-bit raw timestamp value shown in column 306 produces the encoded timestamp value "1011111111" shown in column 312. Thus, raw timestamps in the 512-1k-1 range are represented by encoded timestamps in the 1000000000-1011111111 range.

As shown in column 304, the encoding format associated with row 3 is used to encode timestamp values ranging from "1k" to "8k-1." Column 306 shows the 32-bit equivalents of the minimum and maximum timestamp values that are encoded using the encoding format of row 3. Column 308 indicates that the ELA 202 extracts bits 12:6 of the 32-bit raw timestamp received from the counter 204 and inserts these bits into the bit places marked "X" in the timestamp template of column 310 (i.e., into bits 6:0) to produce the encoded timestamp. As shown in column 310, bits 9:7 are specifically assigned values of "110" to facilitate later decoding of the encoded timestamp. Replacing the bits marked "X" in the timestamp template with bits 12:6 of the minimum 32-bit raw timestamp value shown in column 306 produces the encoded timestamp value "1100010000" shown in column 312. Similarly, replacing the bits marked "X" in the timestamp template with bits 12:6 of the maximum 32-bit raw timestamp value shown in column 306 produces the encoded timestamp value "1101111111" shown in column 312. Thus, raw timestamp values in the 1k-8k-1 range are represented by encoded timestamps in the 1100010000-1101111111 range.

As shown in column 304, the encoding format associated with row 4 is used to encode timestamp values ranging from "8k" to "512k-1." Column 306 shows the 32-bit equivalents of the minimum and maximum timestamp values that are encoded using the encoding format of row 4. Column 308 indicates that the ELA 202 extracts bits 18:13 of the 32-bit raw timestamp received from the counter 204 and inserts these bits into the bit places marked "X" in the timestamp template of column 310 (i.e., into bits 5:0) to produce the encoded timestamp. As shown in column 310, bits 9:6 are specifically assigned values of "1110" to facilitate later decoding of the encoded timestamp. Replacing the bits marked "X" in the timestamp template with bits 18:13 of the minimum 32-bit raw timestamp value shown in column 306 produces the encoded timestamp value "1110000001" shown in column 312. Similarly, replacing the bits marked "X" in the timestamp template with bits 18:13 of the maximum 32-bit raw timestamp value shown in column 306 produces the encoded timestamp value "1110111111" shown in column 312. Thus, raw timestamp values in the 8k-512k-1 range are represented by encoded timestamps in the 1110000001-1110111111 range.

As shown in column 304, the encoding format associated with row 5 is used to encode timestamp values ranging from "512k" to "16M-1" (where M=1024k). Column 306 shows the 32-bit equivalents of the minimum and maximum timestamp values that are encoded using the encoding format of row 5. Column 308 indicates that the ELA 202 extracts bits 23:19 of the 32-bit raw timestamp received from the counter 204 and inserts these bits into the bit places marked "X" in the timestamp template of column 310 (i.e., into bits 4:0) to produce the encoded timestamp. As shown in column 310, bits 9:5 are specifically assigned values of "11110" to facilitate later decoding of the encoded timestamp. Replacing the bits marked "X" in the timestamp template with bits 23:19 of the minimum 32-bit raw timestamp value shown in column 306 produces the encoded timestamp value "1111000011" shown in column 312. Similarly, replacing the bits marked "X" in the timestamp template with bits 23:19 of the maximum 32-bit raw timestamp value shown in column 306 produces the encoded timestamp value "1111011111" shown in column 312. Thus, raw timestamp values in the 512k-16M-1 range are represented by encoded timestamps in the 1111000001-1111011111 range.

As shown in column 304, the encoding format associated with row 6 is used to encode timestamp values ranging from "16M" to "256M-1." Column 306 shows the 32-bit equivalents of the minimum and maximum timestamp values that are encoded using the encoding format of row 6. Column 308 indicates that the ELA 202 extracts bits 27:24 of the 32-bit raw timestamp received from the counter 204 and inserts these bits into the bit places marked "X" in the timestamp template of column 310 (i.e., into bits 3:0) to produce the encoded timestamp. As shown in column 310, bits 9:4 are specifically assigned values of "111110" to facilitate later decoding of the encoded timestamp. Replacing the bits marked "X" in the timestamp template with bits 27:24 of the minimum 32-bit raw timestamp value shown in column 306 produces the encoded timestamp value "1111100001" shown in column 312. Similarly, replacing the bits marked "X" in the timestamp template with bits 27:24 of the maximum 32-bit raw timestamp value shown in column 306 produces the encoded timestamp value "1111101111" shown in column 312. Thus, raw timestamp values in the 16M-256M-1 range are represented by encoded timestamps in the 1111100001-1111101111 range.

As shown in column 304, the encoding format associated with row 7 is used to encode timestamp values ranging from "256M" to "4 G-1" (where G=1024M). Column 306 shows the 32-bit equivalents of the minimum and maximum timestamp values that are encoded using the encoding format of row 7. Column 308 indicates that the ELA 202 extracts bits 31:28 of the 32-bit raw timestamp received from the counter 204 and inserts these bits into the bit places marked "X" in the timestamp template of column 310 (i.e., into bits 3:0) to produce the encoded timestamp. As shown in column 310, bits 9:4 are specifically assigned values of "111111" to facilitate later decoding of the encoded timestamp. Replacing the bits marked "X" in the timestamp template with bits 31:28 of the minimum 32-bit raw timestamp value shown in column 306 produces the encoded timestamp value "1111110001" shown in column 312. Similarly, replacing the bits marked "X" in the timestamp template with bits 31:28 of the maximum 32-bit raw timestamp value shown in column 306 produces the encoded timestamp value "111111111" shown in column 312. Thus, raw timestamp values in the 256M-4 G-1 range are represented by encoded timestamps in the 111110001-1111111111 range.

The encoding format of each row in table 300 is associated with a different level of precision with which a raw timestamp may be encoded. Encoding formats of higher-numbered rows are less precise than those of lower-numbered rows, because the bits extracted from the 32-bit raw timestamp value for insertion into the encoded timestamp templates of higher-numbered rows are more significant than the bits extracted for insertion into the templates of lower-numbered rows. For example, referring to column 308 of row 1, a timestamp encoded with this row's format includes bits 8:0 of the raw timestamp value. Accordingly, timestamps may be encoded to represent every single value in the decimal range of 0-511 (column 304). The encoding format for row 1 is designed to provide lossless compression of timestamps for values 0-511. However, referring to column 308 of row 7, a timestamp encoded with this row's format includes bits 31:28 of the raw timestamp value. In such a case, because the least-significant bits of the raw timestamp value are not included in the encoded timestamp, the encoded timestamp is not as precise as the encoded timestamps that include less-significant bits.

Figure 4:
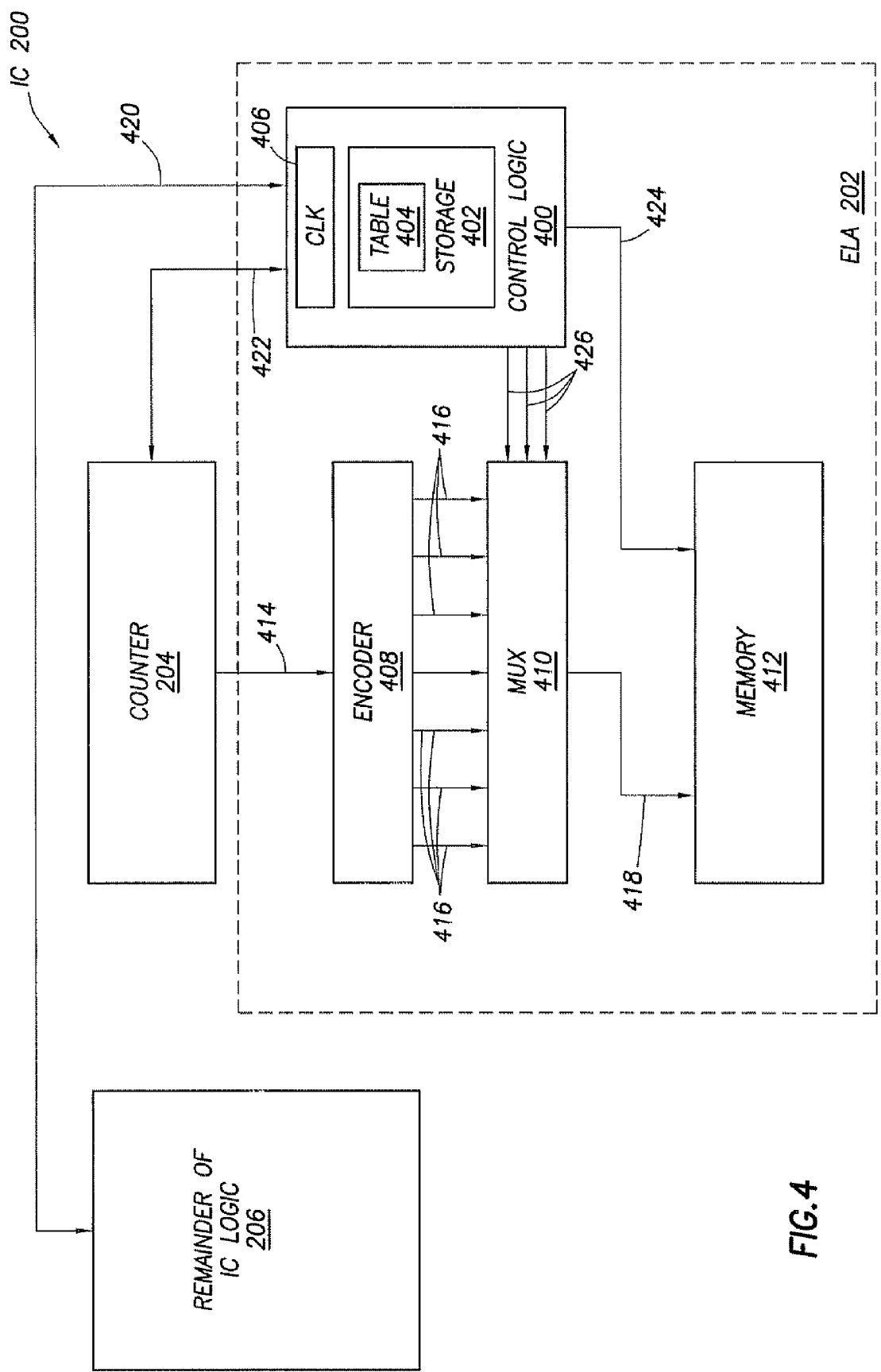
FIG. 4 shows a detailed version of the IC of FIG. 2, in accordance with embodiments of the invention.

FIG. 4 shows a detailed view of the hardware used to implement the encoding techniques described above. Specifically, FIG. 4 shows the IC 200 of FIG. 2 including the ELA 202, the counter 204 and the remainder of the IC logic 206.

The ELA 202 comprises a control logic 400, a storage 402 storing a table 404, a clock (CLK) 406, an encoder 408, a multiplexer (mux) 410 (e.g., a 7:1 mux), and a memory 412. The counter 204 couples to the encoder 408 via a bus 414, the encoder 408 couples to the mux 410 via a plurality (e.g., seven) buses 416, the mux 410 couples to the memory 412 via a bus 418, the remainder of the IC logic 206 couples to the control logic 400 via bus 420, the counter 204 couples to the control logic 400 via bus 422, the control logic 400 couples to the memory 412 via bus 424, and the control logic 400 couples to the mux 410 via multiple buses 426. The operation of the circuit logic of FIG. 4 is now described. The following description is illustrative of some embodiments of the invention, but does not restrict the scope of disclosure to any particular set of operating parameters. Various modifications may be made to the circuit logic of FIG. 4 while still achieving similar functionality.

Coincident with one or more edges of each clock cycle generated by the CLK 406, the control logic 400 receives data from the remainder of the IC logic 206. The control logic 400 determines, based on various pre-programmed requirements, whether a current datum received from the remainder of the IC logic 206 via bus 420 should be logged to the ELA 202 for future analysis. If the control logic 400 determines that a datum is to be logged, the control logic 400 reads the current value of the counter 204. The current value of the counter 204 is associated with the current datum that is to be logged by the control logic 400.

The control logic 400 determines the position of the most significant bit present in the current value of the counter 204. The most significant bit is located because it is used to determine which encoding format (i.e., rows 1-7 of FIG. 3) should be used to encode the current datum. The table 404 comprises a series of entries, each of which cross-references a specific most-significant-bit position with a recommended encoding format. For example, an entry in the table 404 may cross-reference a most-significant bit position with an indicator (e.g., one or more bits) associated with the encoding format of row 3. If the control logic 400 determines that the most-significant bit of the current counter value matches this most-significant bit position, the control logic 400 selects the encoding format of row 3 as the appropriate format with which to encode the current counter value.

Accordingly, based on the position of the most significant bit in the current value of the counter, the control logic 400 uses the table 404 to determine which of the seven encoding formats described in FIG. 3 is suitable for the current counter value. The control logic 400 asserts or unasserts the mux select signals 426 in accordance with the selected encoding format. In some embodiments, the following bit scheme may be used for the mux select signals:

| Encoding format | Mux select signal bit scheme | Position of most significant bit |
| --- | --- | --- |
| Row 1 | 000 | 8:0 |
| Row 2 | 001 | 9 |
| Row 3 | 010 | 12:10 |
| Row 4 | 011 | 18:13 |
| Row 5 | 100 | 23:19 |
| Row 6 | 101 | 27:24 |
| Row 7 | 110 | 31:28 |
| Not used | 111 | |

Thus, for example, if the control logic 400 determines that a current counter value is to be encoded using the format of Row 1, the control logic 400 asserts the select signals 426 as "000."

The encoder 408 receives the current counter value (i.e., the 32-bit raw timestamp value) from the counter 204. In turn, the encoder 408 encodes the 32-bit timestamp into 10-bit timestamps using each of the encoding formats of Rows 1-7 described in FIG. 2. The encoder 408 encodes the timestamp using the timestamp templates shown in column 310 of FIG. 3, which are programmed into the encoder, e.g., by a developer. These seven encodings are transferred to the mux 410 via the seven buses 416, with each bus 416 transferring one of the seven encodings. The encoding that is output by the mux 410 onto bus 418 is determined by the mux select signals 426 output by the control logic 400 as discussed above. The 10-bit encoded timestamp output on the bus 418 is transferred to the memory 412, where the timestamp is stored in association with the current datum transferred to the memory 412 from the control logic 400 via bus 424.

The scope of disclosure is not limited to the format selection scheme implemented by the specific hardware arrangement shown in FIG. 4. For example, in some embodiments, the mux 410 in the hardware of FIG. 4 is removed so that data output by the encoder 408 is transferred to the memory 412 without first passing through the mux 410. In such embodiments, the control logic 400 couples directly to the encoder 408. The control logic 400 first determines a suitable template to be used to encode the current counter value (i.e., raw timestamp) based on the position of the most significant bit in the current counter value. The control logic 400 transfers a signal to the encoder 408 indicating the template selected. In turn, the encoder 408 receives the 32-bit raw timestamp from the counter 204 and encodes the raw timestamp in accordance with the selected timestamp template. The encoder 408 then passes the 10-bit encoded timestamp to the memory 412. The timestamp is stored with any associated data transferred to the memory 412 via bus 424.

FIG. 5 shows a flow diagram of a method 500 associated with the operation of the IC 200 as described above. The method 500 begins by issuing a clock signal (block 502) and determining whether a current datum is to be logged to memory (block 504). If it is determined that the current datum is not to be logged, the datum is discarded (block 505) and the counter is incremented (block 507). However, if it is determined that the datum is to be logged, the method 500 comprises determining the position of the most significant bit in the current value of the counter (block 506). The method 500 further comprises using the position of the most significant bit to determine an encoding format most suitable for the current counter value (block 508) and generating mux select signals accordingly (block 510). The encoding formats may be pre-programmed into the control logic 400 (e.g., the storage 402) by, for example, a developer testing the system 100. The method 500 also comprises encoding the current counter value into multiple (e.g., seven) different encoding formats (block 512). The method 500 comprises using a mux to select from among the multiple different encodings based on the mux select signals (block 514). The method 500 further comprises storing the encoding to memory along with any data associated with the encoding (block 516) and resetting the counter (block 517). The scope of disclosure is not limited to performing the method 500 in the order shown. The various portions of the method 500 may be performed in any suitable order.

As described, in at least some embodiments, each stored, encoded timestamp comprises 10 bits. The stored, encoded timestamp may be decoded by reversing the processes described above. Specifically, the timestamp template used to encode a timestamp is also used to decode the timestamp. The template is used to convert the 10-bit timestamp into its original 32-bit form by inferring the values of the bits more significant than the 10 bits included in the timestamp. In most of the rows, i.e., rows 1 and 3-7, each of the inferred bit values is "0." For example, referring to FIG. 3, a 32-bit timestamp such as 0000 0000 0000 0000 0000 0001 0110 1101 may be encoded using the template of row 1 to produce

0101101101 which is the 10-bit encoded version of the 32-bit timestamp above.

This 10-bit encoded timestamp then may be decoded by, e.g., a developer using a software program, a circuit logic, etc. Decoding the encoded timestamp first involves determining which of the seven templates was used to encode the timestamp. The template used to encode the timestamp is determined by examining the most significant bits of the encoded timestamp. In the current example, the most significant bit is a "0." Referring to column 310 of FIG. 3, it is determined that the template of row 1 is the template that was used to encode the timestamp. Bits 8:0 of the encoded timestamp are extracted from the encoded timestamp and are pre-pended with a sufficient number of "0" bits so that the result is a 32-bit timestamp. In the current example, bits 8:0 of the encoded timestamp are

101101101

These bits 8:0 are then pre-pended with "0" bits until the resulting timestamp has 32 bits:

0000 0000 0000 0000 0000 0001 0110 1101 which is identical to the original 32-bit timestamp shown above.

A similar technique may be used to decode timestamps encoded using the templates of rows 3-7. However, decoding the timestamp of row 2 is somewhat different from decoding timestamps of other rows. Specifically, instead of extracting bits from the encoded timestamp and pre-pending the extracted bits with "0" bits, the extracted bits are first pre-pended with a single "1" bit, followed by 21 "0" bits. The encoding format of row 2 is designed in this way because, as shown in column 304, the encoding format is used to represent decimal values from 512-1023. Accordingly, bit 9 of the 32-bit timestamp is always a "1" bit, and as such, it need not be included in the 10-bit timestamp template. However, when decoding the 10-bit timestamp to its original 32-bit form, the "1" associated with bit 9 of the 32-bit timestamp is pre-pended to bits 7:0 of the encoded timestamp, and the resulting value is then pre-pended with enough "0" bits to produce the original 32-bit timestamp.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A logging system, comprising:
    counting logic adapted to generate a raw timestamp; and
    encoding logic coupled to the counting logic and adapted to insert a group of bits of the raw timestamp into a predetermined timestamp template to produce an encoded timestamp;
    wherein the template is selected based on a position of a most significant bit of the raw timestamp.

2. The system of claim 1, wherein the encoding logic selects the template using a data structure having an entry, and wherein said entry cross-references the most significant bit of the raw timestamp with an indicator associated with said template.

3. The system of claim 1, wherein the encoded timestamp and data associated with the encoded timestamp are stored to a memory.

4. The system of claim 1, wherein the predetermined timestamp template comprises predetermined bits usable to decode the encoded timestamp.

5. The system of claim 4, wherein the predetermined bits of the predetermined timestamp template are not identical to other predetermined bits associated with a second predetermined timestamp template.

6. The system of claim 4, wherein a quantity of said predetermined bits of the predetermined timestamp template is variable.

7. The system of claim 1,
wherein, if the most significant bit of the raw timestamp is located among the nine least significant bits of the raw timestamp, the timestamp template comprises the nine least significant bits of the raw timestamp;
wherein, if the most significant bit of the raw timestamp is the tenth least significant bit of the raw timestamp, the timestamp template comprises the ninth through the second least significant bits of the raw timestamp;
wherein, if the most significant bit of the raw timestamp is located among the thirteenth, twelfth or eleventh least significant bits of the raw timestamp, the timestamp template comprises the thirteenth through the seventh least significant bits of the raw timestamp;
wherein, if the most significant bit of the raw timestamp is located among the nineteenth through the fourteenth least significant bits of the raw timestamp, the timestamp template comprises the nineteenth through the fourteenth least significant bits of the raw timestamp;
wherein, if the most significant bit of the raw timestamp is located among the twenty-fourth through the twentieth least significant bits of the raw timestamp, the timestamp template comprises the twenty-fourth through the twentieth least significant bits of the raw timestamp;
wherein, if the most significant bit of the raw timestamp is located among the twenty-eighth through the twenty-fifth least significant bits of the raw timestamp, the timestamp template comprises the twenty-eighth through the twenty-fifth least significant bits of the raw timestamp; and
wherein, if the most significant bit of the raw timestamp is located among the thirty-second through the twenty-ninth least significant bits of the raw timestamp, the timestamp template comprises the thirty-second through the twenty-ninth least significant bits of the raw timestamp.

8. A system, comprising:
counting logic adapted to generate a raw timestamp;
encoding logic coupled to the counting logic and adapted to encode said raw timestamp in accordance with a plurality of encoding formats to produce a plurality of encoded timestamps;
control logic coupled to the counting logic and adapted to generate a select signal based on a position of a significant bit in the raw timestamp; and
select logic coupled to the encoding logic, said select logic adapted to receive said plurality of encoded timestamps and to select one of said plurality of encoded timestamps for storage based on said select signal.

9. The system of claim 8, wherein the position of the significant bit comprises a position of a most significant bit in the raw timestamp.

10. The system of claim 8, wherein each of the plurality of encoding formats is associated with a different template, each template comprising predetermined bits usable to decode an encoded timestamp.

11. The system of claim 10, wherein the predetermined bits of a first template are not identical to the predetermined bits of a second template.

12. The system of claim 10, wherein a quantity of predetermined bits of a first template is different from that of a second template.

13. The system of claim 8, wherein the encoding logic encodes the raw timestamp by inserting bits associated with said raw timestamp into predetermined timestamp templates to produce said plurality of encoded timestamps.

14. The system of claim 13, wherein each of the predetermined timestamp templates is associated with a different one of said encoding formats.

15. The system of claim 13, wherein the bits inserted into a first predetermined timestamp template are different from the bits inserted into a second predetermined timestamp template.

16. The system of claim 8, wherein the control logic comprises a data structure having an entry, and wherein said entry cross-references the position of the significant bit with said select signal.

17. A method, comprising:
generating a counter value by counting logic;
determining a position of a most significant bit of said counter value;
inserting bits from the counter value into predetermined templates to produce encoded counter values;
selecting one of the encoded counter values based on said position; and
storing said one of the encoded counter values.

18. The method of claim 17, wherein inserting bits from the counter value into the predetermined templates comprises inserting different bits into at least some of said predetermined templates.

19. The method of claim 17, wherein inserting said bits into predetermined templates comprises using templates that contain predetermined bits usable to decode at least one of the encoded counter values.

20. The method of claim 19, wherein the predetermined bits of a first template are not identical to the predetermined bits of a second template.

21. The method of claim 17, wherein selecting one of the encoded counter values comprises using a data structure that cross-references said position with an indicator associated with said one of the encoded counter values.

* * * * *